3,034,555
TRACTION GRIP DEVICE
William Fischer, 7632 Lombard St., Kentland, Md., and Harry E. Pendleton, 1500 Massachusetts Ave. NW., Washington, D.C.
Filed Sept. 1, 1960, Ser. No. 53,408
1 Claim. (Cl. 152—218)

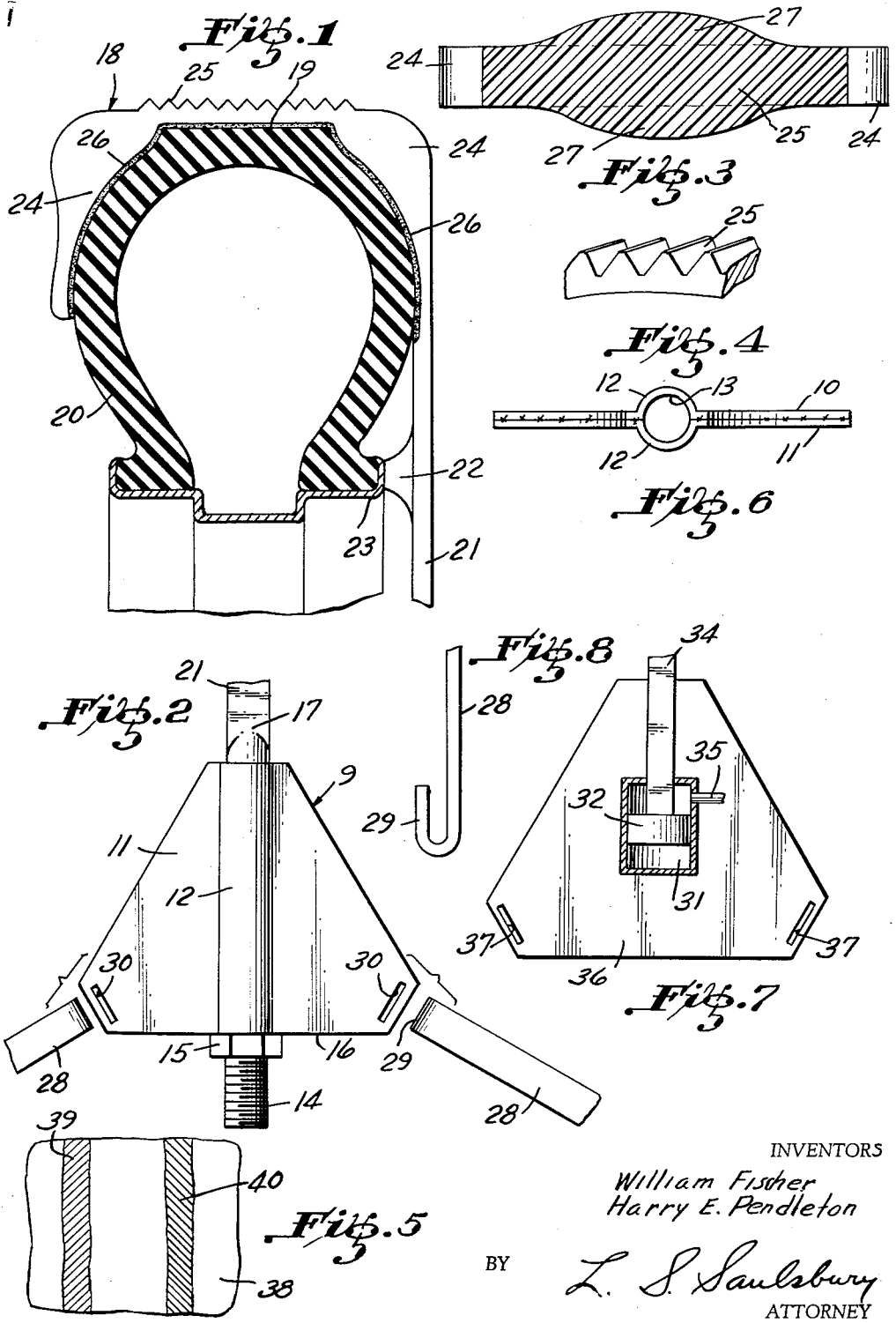

This invention relates to a traction grip device to be applied to the wheels of automobiles, trucks and other vehicles including buses, to facilitate driving over snow, ice, mud and any surface where traction might present difficulties.

It is an object of the present invention to provide a device which is attached to and over the hub or hub cap of vehicles with three or more elongated metal arms securely fastened on a central metal plate, and locked thereon by a screw ratchet device. The extended metal arms go over the tread of the tire and clamp securely on or near the inside rim of the tire, and the metal over the tire has an undercoating of pliable rubber to protect the tire from cuts and bruises and to prevent a bumping or jarring effect. The extended arms and the tire cleats have a built-in attachment designed to materially increase and expand the traction of surface of the tire. The built-in attachment in the surface cleat is referred to as "Rabbit Ears" as the attachment extends beyond the surface of the tire.

It is a further object of the invention to provide a surface cleat so designed to keep the vehicle from an outward skid or movement on ice or snow, and the front tires have a different design on the metal cleat to insure against a skid. The front cleat will cut a groove through snow and ice making a track insuring against skids.

A still further object of the invention resides in the fastening device at the hub plate which is strong and rigid to prevent movement or rattle at any speed of the vehicle. The locking device will be constructed in such a manner to permit an "easy on," "easy off" attachment to permit an instant change on open and dry surfaces on the highway.

Further objects will be apparent from the following description when considered in connection with the accompanying drawings, in which FIGURE 1 is a cross section through a tire showing a part of one of the traction grip devices, FIG. 2 is a plan view of a hub plate with parts of the grip device indicated, FIG. 3 is a top plan view of one of the grip devices, FIG. 4 is a perspective view of a part of the grip tread, FIG. 5 is a diagrammatic view showing the tracks in the mud or snow as made by two opposite grip treads on opposite wheels, FIG. 6 is an end view of the hub plate, FIG. 7 is a plan view of a modified hub plate, and FIG. 8 is a side detail view showing the hook on one of the grip devices.

The traction device is easily applied to the wheel of a vehicle and it consists of a substantially triangular plate 9 which is preferably built in two sections 10 and 11 suitably welded together by spot welding or of course the plate sections may be riveted to each other. The sections 10 and 11 each have a semi-circular groove 12 which together form a circular hole 13 to receive a bolt rod 14. The latter is provided with a nut 15 in threaded engagement with the rod 14 and abutting against the undersurface 16 of the plate 9. It will be evident that upon rotation of the nut 15, the rod 14 will be adjusted relative to the plate 9. It is of course obvious that the sections 10 and 11 may be spot welded only along the peripheral edges or the spot welds may be spaced throughout the contacting surfaces of the sections, FIG. 6.

The outer end of the rod 14 is flattened out beginning at 17 and it is then approximately rectangular in cross section and extends to form substantially U-shaped tread end 18 to curve over the tread 19 of a tire 20 and this end tread 18 is preferably integral with the flat steel rod 21 merging into the rod configuration at 17. Each traction grip device has an abutment element 22 of rubber or plastic secured on the rod 21 and adapted to bear against the rim 23 of the wheel. The U-shaped tread shoe 18 fits around the tire 20 and is provided with a toothed tread portion 25 and side rabbit-like ears 24 which latter tend to grip into the snow, ice and mud. A rubber undercoat 26 is secured on the inner surface of the shoe 18, to contact the tire surface and will reduce wear. The tread portion 25 runs at an angle as shown in FIG. 3 and extended side portions 27 are provided to increase the gripping surface of the grip device. The teeth 25 may be formed as shown in FIG. 4.

As shown in FIGS. 2 and 8, two of the grip devices 28 are each provided with a hook portion 29 to grip into a slot 30 in the triangular plate 9.

Instead of the rod 14 and the nut 15, it is possible to provide a hydraulic cylinder 31 with a piston 32 connected to the end of the rod 34 which latter corresponds to the rod 21 of FIG. 2. A pipe connection 35 connects the cylinder 31 with any suitable source of fluid under pressure such as oil and a suitable control valve, not shown, is connected in the line 35 to control the flow of fluid into and out of the cylinder 31. The plate 36 has suitable slots 37 in the plate into which the gripping shoe treads 18 are connected.

In FIG. 5, is shown a small section of roadway 38 bearing the marks made by the gripping shoes on the wheels in which the left side marks 39 show the teeth marks extending inwardly with the rightside marks 40 directed in the same manner in an inward direction to tend to keep the vehicle wheels gripping toward the center longitudinal line relative to the travel of the vehicle on the road.

The use and the operation of the traction grip device is considered obvious from the foregoing description and the drawing. Due to the rubber abutment element 22 it is possible to secure the grip device on the wheel without any noise due to friction against the rim of the wheel. Also due to the cleats and arms of the device being rubber coated such coating protects against scratches, tire damage, cuts and bruises. The cleats over the tire surface are so designed as shown to fit securely over the tire surface to prevent rattle or bumps or damage to the vehicle.

It is a simple matter to remove or place the grip device on a wheel by simply seating the two cleat members 28 on the tread of the tire and then with the rod 21 gripping over the tire tread the nut 15 is turned to pull the tread portions 25 in firm contact with the tire. Each rod abuts against the rim by its rubber abutment 22 and with the plate 9 adjacent the hub of the wheel, the traction device is firmly held on the tire.

While various changes may be made in the detailed construction, it shall be understood that such changes shall be within the spirit and scope of the invention as defined by the appended claim.

What is claimed is:

A traction grip device for vehicle tires comprising a central plate structure having a hole running in the plane of the plate structure and from one side edge of the plate structure diametrically through the other side edge, a rod extending through the hole, said rod having a tread portion on its outer end adapted to overlie the tire tread, other rod arms detachably secured to the central plate structure extending from the plate at an angle from the one rod and in respect to each other, said other rod arms having tread portions adapted to similarly overlie the tire tread angularly disposed from the one tread and from one another, and means on the central plate and connected to the one rod for tightening the one rod upon the plate and the tread portions into clamping engagement with the tire tread, said means for tightening said one rod comprising a threaded portion disposed on the end of the rod and a tightening nut operable upon the threaded portion and engageable with said other side edge of the plate structure upon the rod being tightened, said other rod arms having hook portions, and said central plate structure having recesses for detachably receiving the hook portions.

References Cited in the file of this patent

UNITED STATES PATENTS

| | | |
|---|---|---|
| 2,352,788 | Hinds | July 4, 1944 |
| 2,397,277 | Lawrence | Mar. 26, 1946 |
| 2,445,913 | Grosjean et al. | July 27, 1948 |
| 2,553,712 | Jensen | May 22, 1951 |
| 2,581,578 | Cruse | Jan. 8, 1952 |
| 2,651,347 | Gardetto | Sept. 8, 1953 |
| 2,722,260 | Renwick | Nov. 1, 1955 |
| 2,886,091 | Hines | May 12, 1959 |